US008561103B2

(12) United States Patent
Begeja et al.

(10) Patent No.: US 8,561,103 B2
(45) Date of Patent: Oct. 15, 2013

(54) METHOD AND APPARATUS FOR PROVIDING A PERSONALIZED TELEVISION CHANNEL

(75) Inventors: Lee Begeja, Gilette, NJ (US); David Gibbon, Lincroft, NJ (US); Zhu Liu, Marlboro, NJ (US); Bernard S. Renger, New Providence, NJ (US); Behzad Shahraray, Freehold, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 333 days.

(21) Appl. No.: 11/478,914

(22) Filed: Jun. 30, 2006

(65) Prior Publication Data
US 2008/0022309 A1 Jan. 24, 2008

(51) Int. Cl.
H04N 7/25 (2006.01)
H04N 7/10 (2006.01)

(52) U.S. Cl.
USPC ........ 725/34; 725/9; 725/10; 725/11; 725/12; 725/13; 725/14; 725/35; 725/46

(58) Field of Classification Search
USPC ...................................... 725/9–14, 34–35, 46
See application file for complete search history.

(56) References Cited

U.S. PATENT DOCUMENTS 6,177,931 B1 * 1/2001 Alexander et al. ............. 725/52
6,642,938 B1 * 11/2003 Gilboy ......................... 715/721
2001/0013123 A1 * 8/2001 Freeman et al. ................ 725/34
2002/0144267 A1 10/2002 Gutta et al.
2003/0126600 A1 7/2003 Heuvelman
2003/0227475 A1 * 12/2003 Fellenstein et al. ........... 345/720
2004/0123318 A1 * 6/2004 Lee et al. ......................... 725/46
2004/0194130 A1 * 9/2004 Konig et al. ..................... 725/32
2004/0255336 A1 12/2004 Logan et al.
2006/0174269 A1 * 8/2006 Hansen-Turton ............... 725/39
2007/0074245 A1 * 3/2007 Nyako et al. .................... 725/34
2007/0266403 A1 * 11/2007 Ou et al. ......................... 725/46

FOREIGN PATENT DOCUMENTS

EP 1223757 7/2002
EP 1401198 3/2004
WO WO-02104001 12/2002
WO WO-2006035406 4/2006

OTHER PUBLICATIONS

PCT Search Report and Written Opinion for PCT/US2007/070883, dated Feb. 6, 2008, consists of 12 unnumbered pages.
Office Action for CA 2,655,830 dated May 16, 2012, consists of 4 unnumbered pages.

* cited by examiner

Primary Examiner — Mulugeta Mengesha

(57) ABSTRACT

A method and apparatus for providing a personalized channel on packet networks are disclosed. For example, a customer may subscribe to a personalized channel service. In one embodiment, a network service provider determines a customer's viewing preference and matches the customer's viewing preference to at least one program that is currently being broadcasted on one of a plurality of broadcast channels. In turn, the personalized channel is populated with the at least one program, i.e., with the program of most interest to the customer.

16 Claims, 5 Drawing Sheets

METHOD AND APPARATUS FOR PROVIDING A PERSONALIZED TELEVISION CHANNEL

The present invention relates generally to communication networks and, more particularly, to a method for providing a personalized television channel in packet networks.

BACKGROUND OF THE INVENTION

Video services are often delivered to customers via a plurality of channels. A customer will often receive hundreds of channels, but only tunes to a specific channel for viewing. As the number of channels continues to grow, a customer often must search through numerous channels to find a program that is interesting to the customer. Such searching is time consuming and a customer may miss a desired program that is being presented on a channel that is not currently being viewed by the customer.

Therefore, there is a need for a method and system to enable a service provider to create a personalized channel that would only present the programs of interest for a particular customer.

SUMMARY OF THE INVENTION

In one embodiment, the present invention discloses a method and apparatus for providing a personalized channel on packet networks. For example, a customer may subscribe to a personalized channel service. In one embodiment, a network service provider determines a customer's viewing preference and matches the customer's viewing preference to at least one program that is currently being broadcasted in one of a plurality of broadcast channels. In turn, the personalized channel is populated with the at least one program, i.e., with the program of most interest to the customer.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing a service with a personalized Television (TV) channel on packet networks such as a Voice over Internet Protocol (VoIP) network, or a Service over Internet Protocol (SoIP) network. Although the present invention is discussed below in the context of transporting packets on VoIP and SoIP networks, the present invention is not so limited. Namely, the present invention can be adapted to any packet networks, cable networks, wireless networks, and the like.

Figure 1:
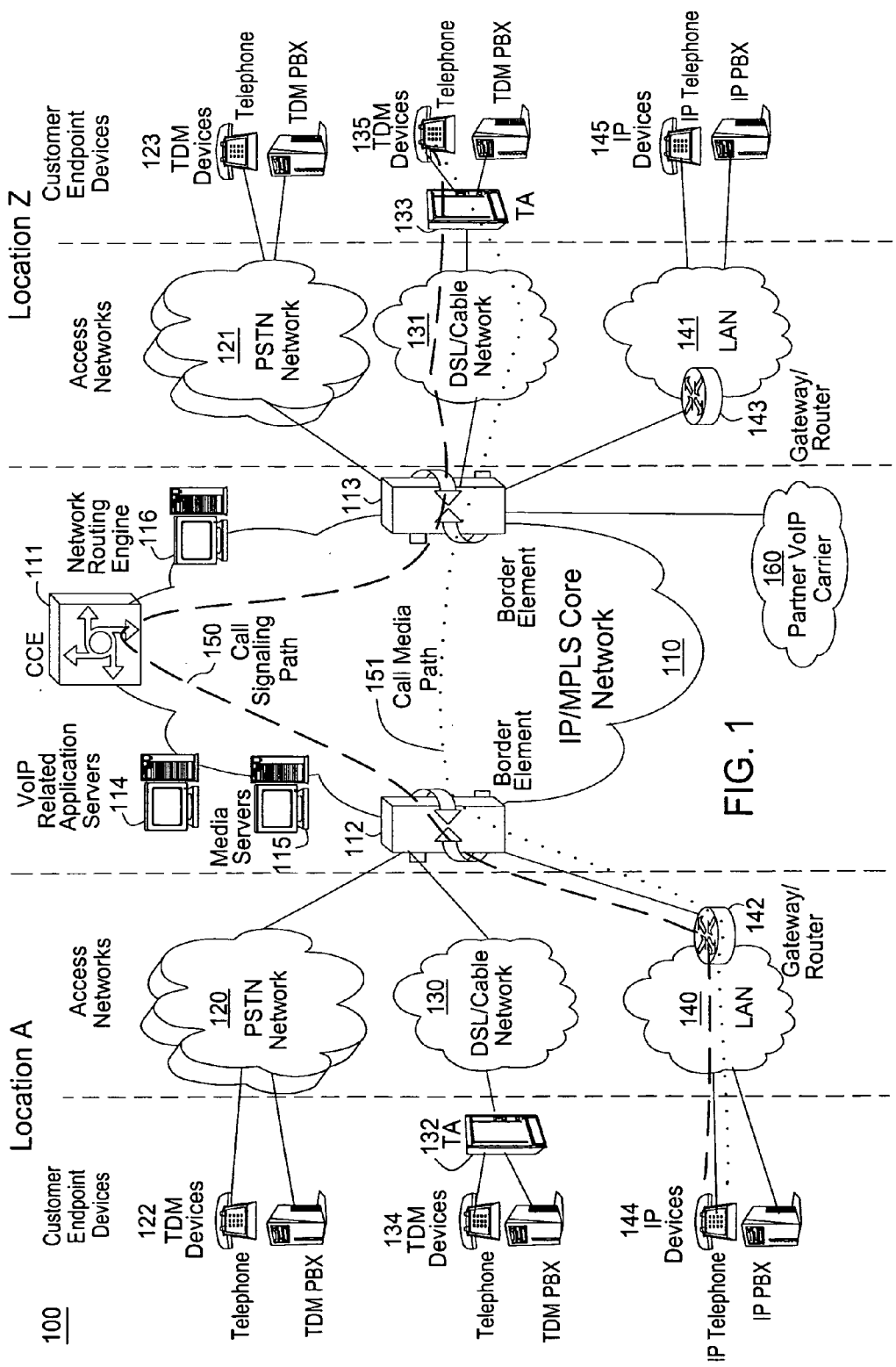
FIG. 1 illustrates an exemplary Voice over Internet Protocol (VoIP) network related to the present invention.

To better understand the present invention, FIG. 1 illustrates communication architecture 100 having an exemplary network, e.g., a packet network such as a VoIP network related to the present invention. Exemplary packet networks include Internet protocol (IP) networks, asynchronous transfer mode (ATM) networks, frame-relay networks, and the like. An IP network is broadly defined as a network that uses Internet Protocol to exchange data packets. Thus, a VoIP network or a SoIP network is considered an IP network.

In one embodiment, the VoIP network may comprise of various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture or to voice signals alone.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise of IP phones or IP PBX. The Terminal Adaptors (TA) 132 and 133 are used to provide necessary inter-working functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related Application Server 114 to obtain the information to complete this call. In one embodiment, the Application Server (AS) functions as a SIP back-to-back user agent. If BE 113 needs to be involved in completing the call, CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the called party accepts the call at location Z, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and that provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
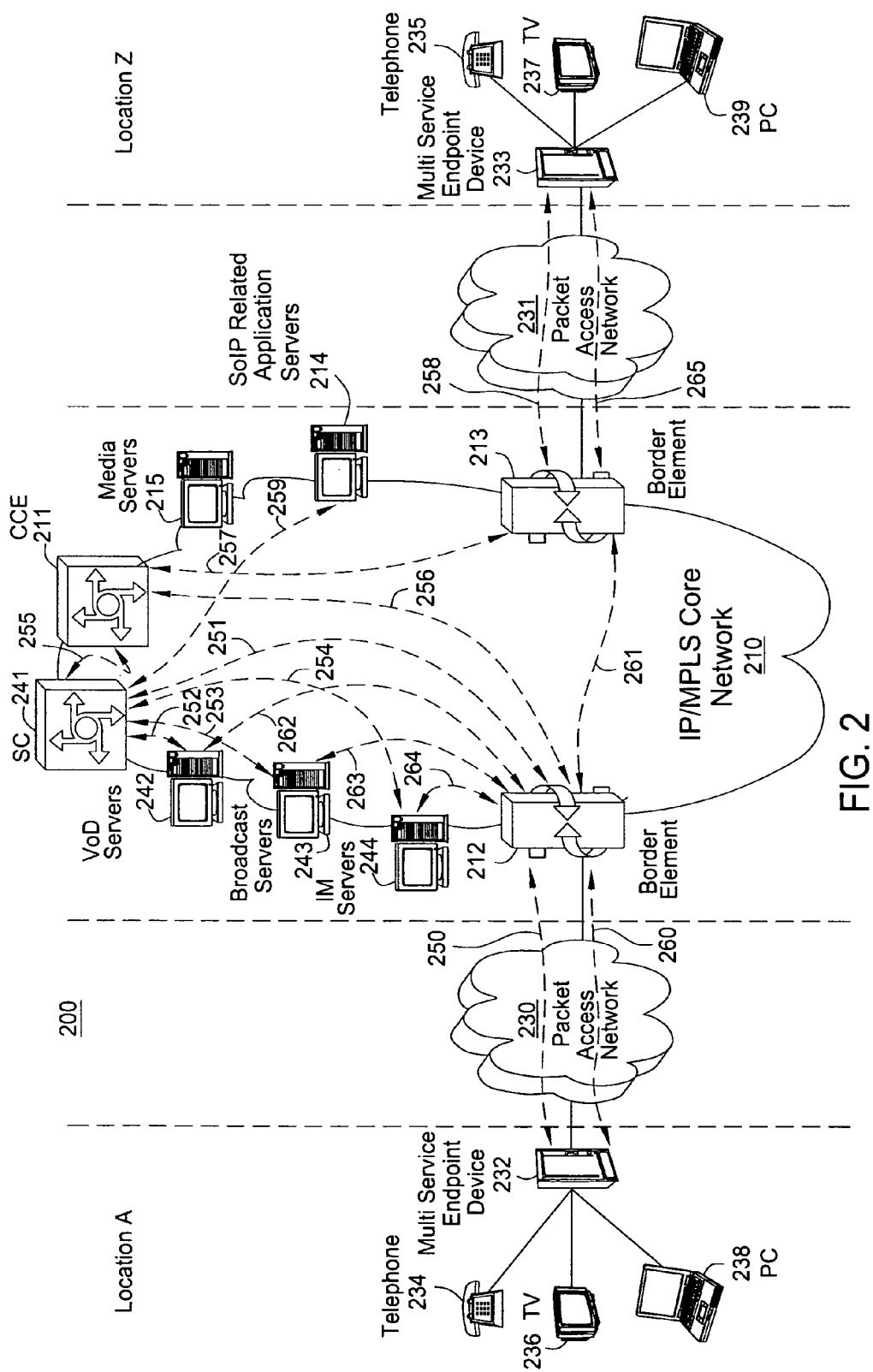
FIG. 2 illustrates an exemplary Service over Internet Protocol (SoIP) network related to the present invention.

The network shown in FIG. 1 can be extended to become a SoIP network that supports multi-service applications including, but is not limited to, video services. FIG. 2 illustrates communications architecture 200 having an exemplary network, e.g., a packet network such as a SoIP network related to the present invention. A SoIP network supports multi-service applications including voice, data, and video services. In one embodiment, a SoIP network that supports video services is described below. In this SoIP network, voice services supported include, but are not limited to, VoIP services; data services supported include, but are not limited to, Instant Messaging (IM), electronic mail (email), internet access services, or any other IP based applications; and video services include, but are not limited to, Video on Demand (VoD), broadcast video, and video conferencing services.

A SoIP network that supports video services comprises of an intelligent multi-service endpoint device connected via packet access networks to a service provider's SoIP core infrastructure employing Internet Protocol (IP) and/or Multi-Protocol Label Switching (MPLS) Protocols. Broadly defined, a SoIP network is a network that is capable of carrying voice, video, and data signals as packetized data over an IP network. The present invention is described below in the context of an illustrative SoIP network that supports video services. Thus, this particular illustrative architecture should not be interpreted as limiting the present invention.

Multi-service endpoint devices 232 and 233 are IP based intelligent endpoint devices supporting voice, video, and data applications. Multi-service endpoint devices 232 and 233 are signaling endpoints of application sessions, e.g., a VoIP session endpoint, an instant messaging endpoint, or a video session endpoint. In one embodiment, a multi-service endpoint device is a standalone device that can be connected to home electronic appliances such as, but is not limited to, telephone 234 and 235, TV 236 and 237, or Personal Computer (PC) 238 and 239. In another embodiment, a multi-service endpoint device can be integrated with a TV, a PC, or any home appliances with a display.

The access networks are packet based. Packet based access networks 230 and 231 use, but are not limited to, Frame Relay, ATM, Ethernet, IP, DSL or Cable broadband access network technologies to interconnect a multi-service endpoint device to a SoIP network that supports video, data and voice services.

The core SoIP infrastructure that supports video services comprises of several key components, such as the Border Element (BE) 212 and 213, the Call Control Element (CCE) 211, SoIP related Application Servers (AS) 214, Media Servers (MS) 215, Session Controller (SC) 241, Video of Demand (VoD) Servers 242, Broadcast Servers (243), and Instant Messaging (IM) Servers 244. A BE resides at the edge of the SoIP core infrastructure and interfaces with customer endpoints over various types of access networks. The functions supported by a BE include those supported by a BE as previously described in network 100 and FIG. 1. In addition, in a SoIP network that supports video services, a BE also serves as a gateway between a multi-service endpoint device used by a subscriber and the SoIP core network that supports video services. All application sessions initiated by a SoIP subscriber must gain entry to the SoIP core network via a BE. The functions supported by a CCE and a MS are the same as those previously described in network 100 and FIG. 1. A Session Controller (SC) resides within the SoIP infrastructure and is connected to the BEs using an IP based signaling protocol such as, but not limited to, Session Initiation Protocol (SIP). A SC is responsible for setting up all application session requests, such as VoIP call requests, video session requests, or data session requests, originated by a customer within the network and interacts with, if necessary, the appropriate SoIP related AS in order to complete an application session that requires certain service specific features originated by a customer. A SC also keeps track of all sessions initiated by a customer for session management and billing purposes. The functions supported by a SoIP related AS include those supported by a VoIP AS as previously described in network 100 and FIG. 1. In addition, a SoIP AS also supports all video specific application features. A VoD Server is responsible for supporting video on demand video session requests originated by a customer and sends the requested streaming video contents, such as a movie, to the customer. A broadcast server is responsible for supporting broadcast video sessions originated by a customer. The broadcast server also sends streaming broadcast video contents, such as TV channels, to the customer. The VoD Server and the Broadcast Server send streaming video contents to multi-service endpoint devices using compression technologies including, but not limited to, Moving Picture Experts Group (MPEG) 2, MPEG 4, MPEG 7, MPEG 21. An IM Server is responsible for supporting IM applications involving multiple users. Instant Messaging is a form of electronic communication that involves immediate typed text correspondence between two or more users over the Internet who are online simultaneously. IM is a text-based computer conference over the Internet between two or more people who are online at the same time.

In order to illustrate how the different components in a SoIP network operate to support video services, the following scenarios are used to illustrate how voice, data, and video sessions are setup between the SoIP network and a customer endpoint. In one embodiment, a customer using a multi-service endpoint device 232 at location A places a VoD session request to the SoIP network that supports video services using TV 236. During the session initiation, a setup-signaling message is sent from multi-service endpoint device 232 to BE 212 using signaling path segment 250. BE 212 will then send a setup signaling message, such as a SIP-INVITE message if SIP is used, to SC 241 using signaling path segment 251. SC 241 processes the session requests and forwards the request to the appropriate server for further processing. In this case, the request is a VoD session; therefore, the request will be forwarded to VoD Server 242 using signaling path segment 252. SC 241 may interact with AS 214 using signaling path segment 259 to verify customer's subscription information or to retrieve video specific applications or data in order to complete the session request. Once the VoD session is verified, VoD Server 242 sends the requested VoD streaming contents to BE 212 using data path segment 262. BE 212 then forwards the requested VoD streaming contents to multi-service endpoint 232 using data path segment 260. Similarly, a customer at location Z using TV 237 connected to multi-service endpoint device 233 can request a VoD session via SC 241 with streaming VoD contents sent by VoD Server 242. Note that a VoD server may be placed closer to end users in a packet access network to serve multi-service endpoints in an alternative embodiment.

In another embodiment, a customer using multi-service endpoint device 232 at location A places a broadcast video session request to the SoIP network that supports video services using TV 236. During the session initiation, a setup-signaling message is sent from multi-service endpoint device 232 to BE 212 using signaling path segment 250. BE 212 will then send a setup signaling message, such as a SIP-INVITE message if SIP is used, to SC 241 using signaling path segment 251. SC 241 processes the session requests and forwards the request to the appropriate server for further processing. In this case, the request is a broadcast video session for a particular premium TV channel; therefore, the request will be forwarded to Broadcast Server 243 using signaling path segment 253. SC 241 may interact with AS 214 using signaling path segment 259 to verify customer's subscription information or to retrieve video specific applications or data in order to complete the session request. Once the broadcast session is verified, Broadcast Server 243 sends the requested broadcast video streaming contents to BE 212 using data path segment 263. BE 212 then forwards the requested broadcast video streaming contents to multi-service endpoint 232 using data path segment 260. Similarly, a customer at location Z using TV 237 connected to multi-service endpoint 233 can request a broadcast video session via SC 241 with streaming broadcast video contents sent by Broadcast Server 243. Note that a Broadcast server may be placed closer to end users in a packet access network to serve multi-service endpoints in an alternative embodiment.

In another embodiment, a customer using multi-service endpoint device 232 at location A places an IM session request to the video network using PC 238. During the session initiation, a setup signaling message is sent from multi-service endpoint device 232 to BE 212 using signaling path segment 250. BE 212 will then send a setup signaling message, including login and password information of the user, to SC 241 using signaling path segment 251. SC 241 processes the session requests and forwards the request to the appropriate server for further processing. In this case, the request is to sign on an IM session. Therefore, the request will be forwarded to IM Server 244 using signaling path segment 254. SC 241 may interact with AS 214 using signaling path segment 259 to verify customer's subscription information or to retrieve IM specific applications or data in order to complete the session request. Once the IM session is verified, IM Server 244 establishes the requested IM data path to multi-service endpoint 232 via BE 212 using data path comprising data path segments 260 and 264. Similarly, a customer at location A using TV 236 connected to multi-service endpoint 232 or a customer at location Z using PC 239 or TV 237 connected to multi-service endpoint 233 can request an IM session via SC 241 with IM functions provided by IM Server 244.

In another embodiment, a customer using multi-service endpoint device 232 at location A places a VoIP session request destined to multi-service endpoint device 233 via the SoIP network that supports video services using telephone 234. During the session initiation, a setup signaling message is sent from multi-service endpoint device 232 to BE 212 using signaling path segment 250. BE 212 will then send a setup signaling message, such as a SIP-INVITE message if SIP is used, to SC 241 using signaling path segment 251. SC 241 processes the session requests and forwards the request to the appropriate server for further processing. In this case, the request is a VoIP session for a call destined to a called party at location Z; therefore, the request will be forwarded to CCE 211 using signaling path segment 255.

SC 241 may interact with AS 214 using signaling path segment 259 to verify customer's subscription information or to retrieve VoIP specific applications or data in order to complete the session request. The signaling flows to establish a VoIP call between multi-service endpoint device 232 and 233 are similar to those described previously in network 100 and FIG. 1.

In one embodiment, the Application Server (AS) functions as a SIP back-to-back user agent. Since BE 213 needs to be involved in completing the call; CCE 211 sends another call setup message, such as a SIP-INVITE message if SIP is used, to BE 213 using signaling path segment 257. Upon receiving the call setup message, BE 213 forwards the call setup message, via packet access network 231 to multi-service endpoint device 233 using signaling path segment 258. The multi-service endpoint device 233 then identifies telephone 235 and rings that telephone. Once the called party accepts the call at location Z, a call acknowledgement signaling message, such as a SIP 200 OK response message if SIP is used, is sent in the reverse direction back to the CCE 211.

After the CCE 211 receives the call acknowledgement message, it will then send a call acknowledgement signaling message, such as a SIP 200 OK response message if SIP is used, toward the calling party at location A using signaling path comprising signaling path segments 256 and 250 via BE 212. In addition, the CCE 211 also provides the necessary information of the call to BE 212 and BE 213 so that the call data exchange can proceed directly between BE 212 and BE 213. CCE 211 also provides the call completion status of a VoIP call to SC 241. The call media path comprising media path segment 260, 261, and 265 are illustratively shown in FIG. 2. Note that the call signaling path and the call media path are different because once a call has been setup between two multi-service endpoint devices, SC 241 and CCE 211 don't need to be in the data path for actual direct data exchange.

As extremely high bandwidth access networks become more accessible to residential subscribers, the high bandwidth networks enable service providers to integrate voice, video, and data, thereby providing more convenience for end customers and creating new service opportunities. The Internet based infrastructure offers the consumer much greater flexibility and control for voice and data services as compared to the services delivered on traditional network.

On the other hand, video services are delivered to customers via broadcast channels intended for mass use. In addition to traditional television channels, the term "broadcast channel" as used in this document can also refer to a media stream from an Internet site delivered via unicast, multicast, or other protocols. A customer will often receive hundreds of channels, but only tunes to a specific channel for viewing. As the number of channels continues to grow, a customer often must search through numerous channels to find a program that is interesting to the customer. Such searching is time consuming and a customer may miss a desired program that is being presented on a channel that is not currently being viewed by the customer. Therefore, there is a need for a method that enables the VoIP or SoIP service provider to create a personalized channel that would present the programs of most interest to the viewer.

In one embodiment, the current invention discloses a method and apparatus for providing a personalized TV channel on packet networks. In order to clearly illustrate the teachings of the current invention, the following networking terminologies will first be described:

A set-top box; and

Video segmentation.

A set-top box is a device with input and output interfaces that enables a user to receive video channels. The interfaces are employed for communicating with a display device (e.g., a television or a monitor), the user (e.g., a remote control), a service provider's network, and/or other home-network components. The set-top box may contain a tuner for channel selection by the user, a display for indicating the selected channel to the user, an interface for changing the channel (up/down buttons), a processor for controlling the various functions and a data modem for interacting with the service provider. If the set-top box has a remote controller, then it also has one or more infrared sensors to receive user input via the remote control.

Video segmentation is a process of partitioning video programs into segments (e.g., scenes) with similar visual content. For example, algorithms may detect well-pronounced, sudden changes in visual content that are indicative of editing cuts in the video. The beginning of a new story may coincide with a transition in the video and may provide a story boundary. The algorithm may also detect a gradual change in a scene such as when fading is introduced. In programs such as news, speaker boundaries may provide content boundaries. For example, an anchorperson is used to introduce new segments. The content then changes every time the anchorperson appears in the scene. Commercial detection, anchorperson detection, etc. may be used in the video segmentation method.

Figure 3:
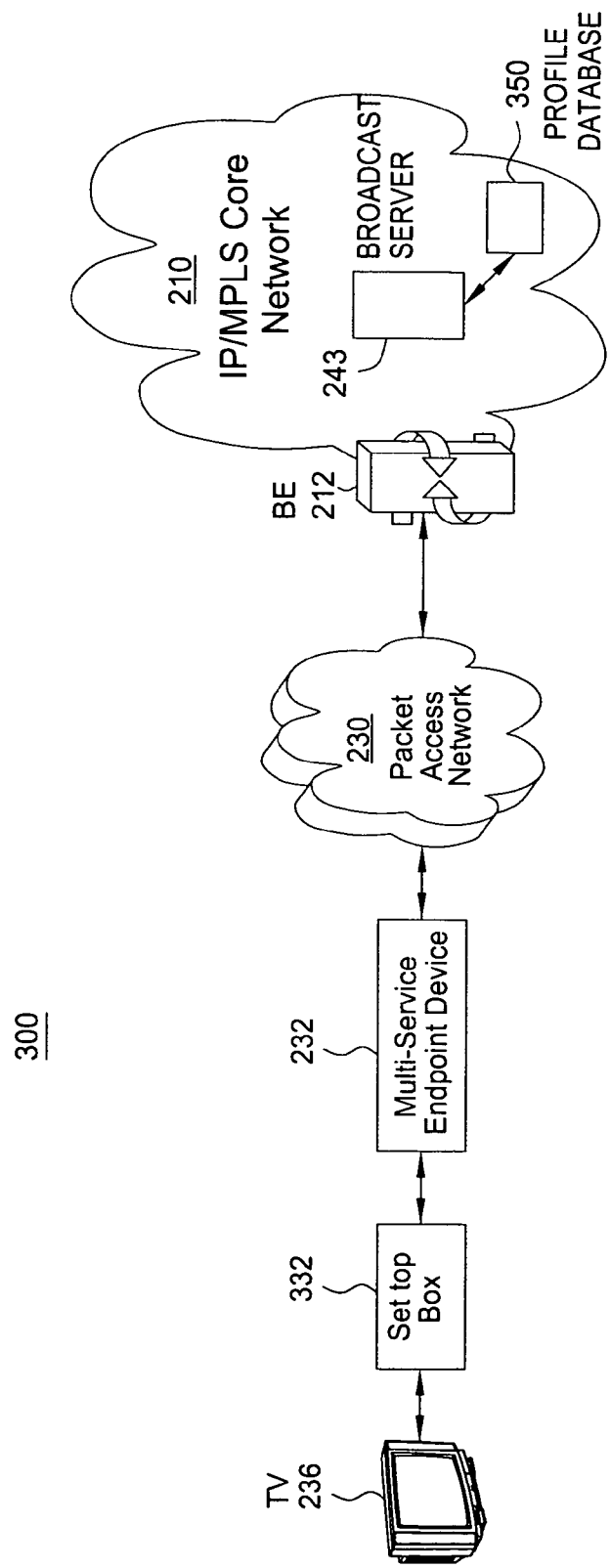
FIG. 3 illustrates an exemplary network with one embodiment of the invention for providing a personalized TV channel.

FIG. 3 illustrates an exemplary network of the present invention to provide a personalized TV channel. For example, a customer is using a TV 236 and a set-top box 332 to access broadcast channels. The set-top box 332 is connected to a multi-service endpoint device 232. The multi-service endpoint device is connected to a packet access network 230. The access network 230 accesses the IP/MPLS core network 210 via a border element 212. In one embodiment, the service provider utilizes one or more broadcast servers 243 and profile database 350 to provide a personalized TV channel.

In one embodiment, a customer may subscribe to a personalized channel service. This service can be provided by a service provider who will populate a personalized channel with programs that are deemed to be of interest to a customer. For example, channel 1 can be reserved by a service provider as the personalized channel for all customers. If a customer has subscribed to the service, then the customer may simply tune to channel 1 and the service provider will populate this personalized channel with programs that are deemed to be of interest to a particular customer. If a customer has not subscribed to the service, then no programming is provided on channel 1.

To illustrate, a customer using the set-top box 332 and the multi-service endpoint device 232 may place a request for service for a personalized TV channel. The request is forwarded to the broadcast server 243 via the access network 230 and BE 212. In one embodiment, the network service provider immediately begins to determine or learn the customer's viewing preference. For example, a customer may simply create and submit a customer viewing profile to the service provider. (e.g., for weekdays: family programs from 5:00 PM to 9:00 PM, sitcoms from 9:00 PM to 11:00 PM, news from 11:00 PM to 11:30 PM; for weekends: cartoons from 8:00 AM to 12:00 PM, sports programs from 12:00 PM to 5:00 PM, sitcoms from 9:00 PM to 11:00 PM, news from 11:00 PM to 11:30 PM and so on). Certainly, the user may actually specify the exact programs, e.g., the show "Seinfeld" from 9:00 PM to 9:30 PM, Yankee baseball games on weekends, and so on.

Alternatively, a customer need not specify his or her viewing preferences at all. Instead, the broadcast server 243 will simply begin to track the viewing habit of the viewer via the set-top box and will attempt to match the viewer's deduced preference with currently running programs. Namely, the broadcast server is analyzing the viewer's TV channel selection data. For example, a customer may click through a plurality of channels quickly, but may dwell for some time at a particular channel to view a particular program. Upon seeing a commercial, the viewer may again click through a plurality of channels quickly to locate another program of interest at another channel. The service provider may gather data via the set-top box 332 provided with the broadcast service, or from the multi-service endpoint device 232. Over a period of time, the service provider will gather sufficient channel selection information (e.g., the type of programs that are viewed and time duration spent at each program) to determine user interest in a variety of programs. The service provider is then able to develop a predictive model for the specific viewer and store it in the profile database 350.

In one embodiment, the service provider then performs video segmentation on available programs that are currently being broadcasted to determine which program is the best fit for the viewer for a particular time slot. It should be noted that the programs are not specifically generated and delivered solely to the customer in the personalized channel. Instead, the selected programs are already currently available on the other broadcast channels. The present invention selects one of the currently broadcasted programs for insertion or mapping to the personalized channel. To illustrate, if channel 50 is currently showing a sports event and the system determines that the viewer wants to watch a sports event at the current time, then the sports event on channel 50 will be automatically mapped to channel 1. In this manner, the viewer does not need to cycle or click through a plurality of channel to locate the sports event on channel 50. Instead, by tuning to channel 1, the system has already populated the desired program for the viewer.

There are various techniques for video segmentation and/or splicing. Those skilled in the art would realize the present invention is not limited to a specific video segmentation/splicing technique. Furthermore, each program presented in the personalized channel need not be presented in its entirety before the next program is played. For example, if it is the preference of the viewer that a sports event is to be presented in the personalized channel, but commercials are to be replaced with news, then upon detection of a commercial, the system will populate the personalized channel with a news program from another channel until the sports event is again displayed. This dynamic video segmentation and splicing of programs from a plurality channels effectively minimizes the need for the viewer to surf between channels to seek out programs of interest.

It should be noted that in one embodiment, the splicing of a new program onto the personalized channel is not automatic. For example, an icon can be presented to warn the user that a program of interest is now available. If the user desires to switch to the new program, then the user can click on the remote control to allow the video splicing to occur.

Thus, as time progresses, the service provider will become more attuned to the viewer's preference, thereby creating a personalized virtual channel that will be populated with the programs of most interest to the customer. It should be noted that the viewer's preference can be determined at the network level, e.g., by the broadcast server which will generate the proper commands to the set-top box for program selection. Alternatively, the viewer's preference can be determined locally at the customer equipment level, e.g., by the set-top box or by the multi-service endpoint device. Those skilled in the art will realize that the functions provided by the set-top box and multi-service endpoint device may be provided as separate units or in one integrated unit. Furthermore, the device may be located at the customer premise or the service provider's network.

In another embodiment, the service provider may provide a program guide for the personalized channel, thereby allowing the customer to provide feedback for changing the content of the personalized virtual channel. For example, the customer may be provided with various options where multiple programs of interest are all available at the same time, e.g., a football game versus a hockey game. The feedback enables the customer to choose the preferred program for the personalized channel. The feedback may also be used to update user preference data for future viewing.

Figure 4:
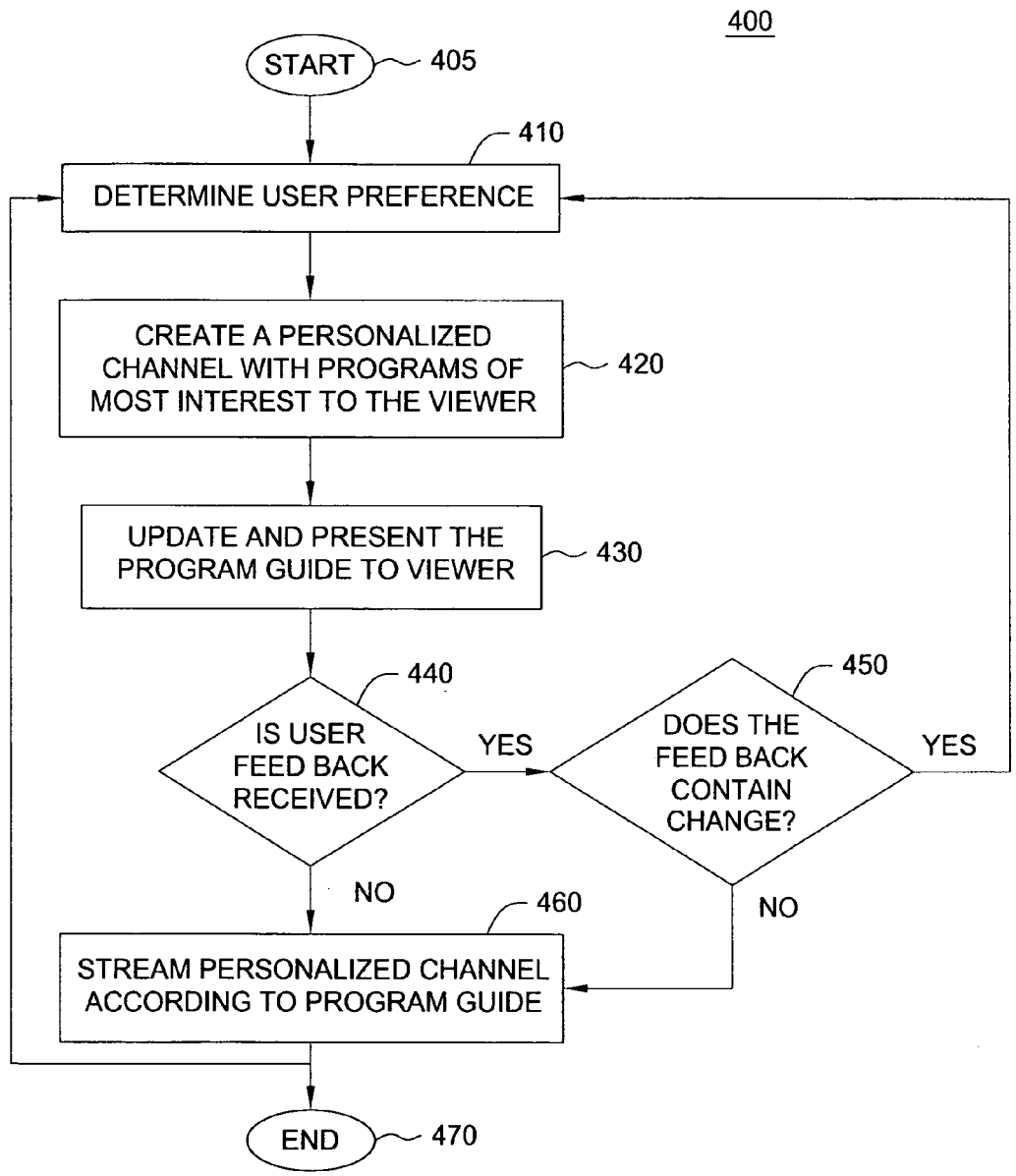
FIG. 4 illustrates a flowchart of a method for providing a personalized TV channel.

FIG. 4 illustrates a flowchart of a method 400 for providing a personalized TV channel. In one embodiment, the service provider enables the customer to subscribe to a personalized TV channel service that broadcasts the program of most interest to the viewer. Method 400 starts in step 405 and proceeds to step 410.

In step 410, method 400 determines a user's viewing preference. The preference can be dynamically determined by keeping track of the channels and programs that the customer is watching and/or determined from a user profile that is submitted by the user. The user profile is initially collected when the customer subscribes to the service and may be updated as needed.

A set-top box that keeps track of channel changes, time duration, etc. can be used with the TV. The data is used to predict the viewer's interest level in various programs and/or channels. For example, if the viewer is searching through the channels for comedy segments, talk shows, news, sports events, etc., predictions are made for future viewing based on the gathered data. The service provider may extract program information from meta information included in programs. An example of meta information is provided below:

<Title> The Tonight Show With Jay Leno</title>
<MediaNetworkAffiliation>NBC Affiliate</ MediaNetworkAffiliation>
<MediaStationName>WNBC</MediaStationName>
<description>Comic Tim Allen; actress Michelle Rodriguez; Bon Jovi performs.</description>
<genre category="Series">Comedy</genre>
<genre category="Series">Talk Show</genre>
<ParentalRating>TV-14</ParentalRating>

In one embodiment, the plain text may be collected from the recording and the XML format may be used for archiving. In one embodiment, the program of most interest is determined by the broadcast server and provided to the set-top box. In another embodiment, the program of most interest is determined in a customer premise device, e.g., set-top box, multi-service end device, computer in a home network, etc.

In step 420, method 400 creates a personalized virtual channel with the programs of most interest to the viewer. For example, if a customer has access to 1000 channels, the personalized channel may be channel 1001 containing the programs of most interest selected from among the 1000 channels. The customer may then tune to channel number 1001 to view the personalized virtual channel. As new programs begin, the customer may be notified of other choices of similar or comparable interest. The method then proceeds to step 430 to update and present the program guide to the viewer.

In step 430, method 400 updates and/or presents the program guide to the viewer. For example, if a viewer is watching a basketball game, he/she may be equally interested in other basketball games. As the other basketball games start, the program guide is then updated and/or presented to the user, thereby enabling the viewer to select another game to view.

In step 440, method 400 determines whether or not a user feedback is received. For the above example, the viewer may choose to watch another game. If feedback is received from the viewer, the method proceeds to step 450 to determine whether or not the feedback contains a change. Otherwise, the method proceeds to step 460 to continue streaming the personalized channel according to the current program guide.

User feedback can take many forms and is not restricted to direct actions of choosing preferences for a user profile. There are other ways to determine user interest through recording user actions that would be both direct (like choosing a particular program; purchasing a particular program; putting an annotation onto a particular program—"Mary would like this show"; etc.) or indirect (like clicking through a set of channels and then stopping on one; dwelling on one channel more than others even while clicking through; dwelling on one type of content across many channels; etc.).

The present invention could then use several techniques that would include Information Retrieval, collaborative filtering, relevance feedback and take these measures of user interest (such as dwell time, click through), and user activities like annotation, and purchasing and develop predictive models for a variety of purposes. The present invention could combine these techniques with video segmentation techniques to determine which of the currently running programs is the best fit for this viewer at this time.

In step 450, method 400 determines whether or not the received feedback contains a change of program. If it contains a change, the method proceeds to step 410 to update user preference. For example, if the customer indicates changing to movie programs, then the personalized channel content needs to be updated based on user preference. If no change is included, in the user feedback, then the method proceeds to step 460 to continue streaming the personalized channel.

In step 460, method 400 continues streaming the personalized channel according to the program guide. The program guide contains programs of most interest to the viewer. The method then proceeds to step 470 to end processing the current request or to step 410 to continue determining user preference.

Figure 5:
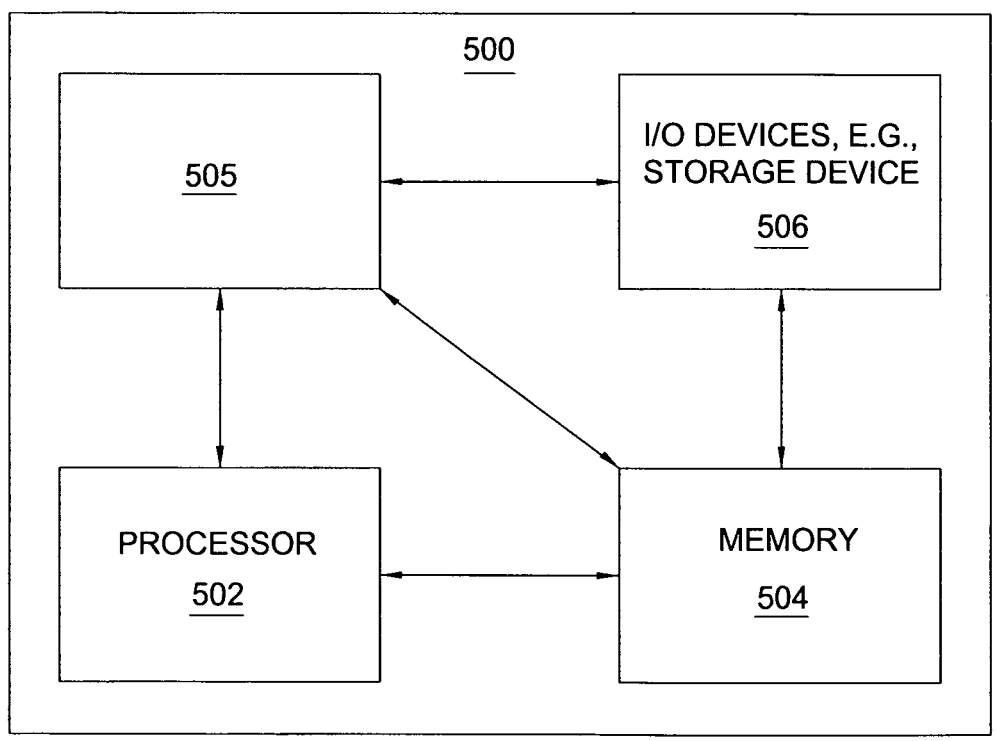
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises of a processor element 502 (e.g., a CPU), a memory 504, e.g., random access memory (RAM) and/or read only memory (ROM), a module 505 for providing a personalized television channel, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present invention can be implemented in software and/or in a combination of software and hardware, e.g., using application specific integrated circuits (ASIC), a general-purpose computer or any other hardware equivalents. In one embodiment, the present module or process 505 for providing a personalized television channel can be loaded into memory 504 and executed by processor 502 to implement the functions as discussed above. As such, the present method 505 for providing a personalized television channel (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a personalized channel to a customer, comprising:

determining, via a processor of an application server of a service provider network, a customer's viewing preference;

matching, via the processor, the customer's viewing preference to a program that is currently being broadcasted on one of a plurality of broadcast channels;

creating, via the processor, a personalized channel populated with the program, wherein the personalized channel is different from the plurality of broadcast channels;

detecting, via the processor, an availability of another program of interest that is different from the program;

detecting, via the processor, a commercial on the program on the personalized channel; and splicing, via the processor, a portion of the another program of interest onto the personalized channel to replace the commercial on the program on the personalized channel, wherein the another program comprises a program that is derived from another channel, wherein the portion of the another program of interest is not a commercial.

2. The method of claim 1, further comprising:

providing a program guide for the personalized channel.

3. The method of claim 1, wherein the customer's viewing preference is determined in accordance with a user profile.

4. The method of claim 1, wherein the customer's viewing preference is determined dynamically by monitoring the customer's viewing selections.

5. The method of claim 4, wherein the customer's viewing preference is determined dynamically via a set-top box.

6. The method of claim 1, further comprising:

receiving feedback from the customer for changing the program on the personalized channel.

7. A non-transitory computer-readable medium storing a plurality of instructions which, when executed by a processor of an application server of a service provider network, cause the processor to perform operations for providing a personalized channel to a customer, the operations comprising:

determining a customer's viewing preference;

matching the customer's viewing preference to a program that is currently being broadcasted on one of a plurality of broadcast channels;

creating a personalized channel populated with the program, wherein the personalized channel is different from the plurality of broadcast channels;

detecting an availability of another program of interest that is different from the program;

detecting a commercial on the program on the personalized channel; and splicing a portion of the another program of interest onto the personalized channel to replace the commercial on the program on the personalized channel, wherein the another program comprises a program that is derived from another channel, wherein the portion of the another program of interest is not a commercial.

8. The non-transitory computer-readable medium of claim 7, further comprising:

providing a program guide for the personalized channel.

9. The non-transitory computer-readable medium of claim 7, wherein the customer's viewing preference is determined in accordance with a user profile.

10. The non-transitory computer-readable medium of claim 7, wherein the customer's viewing preference is determined dynamically by monitoring the customer's viewing selections.

11. The non-transitory computer-readable medium of claim 10, wherein the customer's viewing preference is determined dynamically via a set-top box.

12. The non-transitory computer-readable medium of claim 7, further comprising:
receiving feedback from the customer for changing the program on the personalized channel.

13. A system for providing a personalized channel to a customer, comprising:
a processor; and
a computer-readable medium storing a plurality of instructions which, when executed by the processor, cause the processor to perform operations, the operations comprising:
determining a customer's viewing preference;
matching the customer's viewing preference to a program that is currently being broadcasted on one of a plurality of broadcast channels;
creating a personalized channel populated with the program, wherein the personalized channel is different from the plurality of broadcast channels;
detecting an availability of another program of interest that is different from the program;
detecting a commercial on the program on the personalized channel; and
splicing a portion of the another program of interest onto the personalized channel to replace the commercial on the program on the personalized channel, wherein the another program comprises a program that is derived from another channel, wherein the portion of the another program of interest is not a commercial.

14. The system of claim 13, further comprising:
providing a program guide for the personalized channel.

15. The system of claim 13, wherein the customer's viewing preference is determined in accordance with a user profile.

16. The system of claim 15, wherein the customer's viewing preference is determined dynamically via a set-top box.

* * * * *